Aug. 22, 1933.                J. PRATT                1,923,842
SPRAG GEAR MECHANISM
Filed March 12, 1931
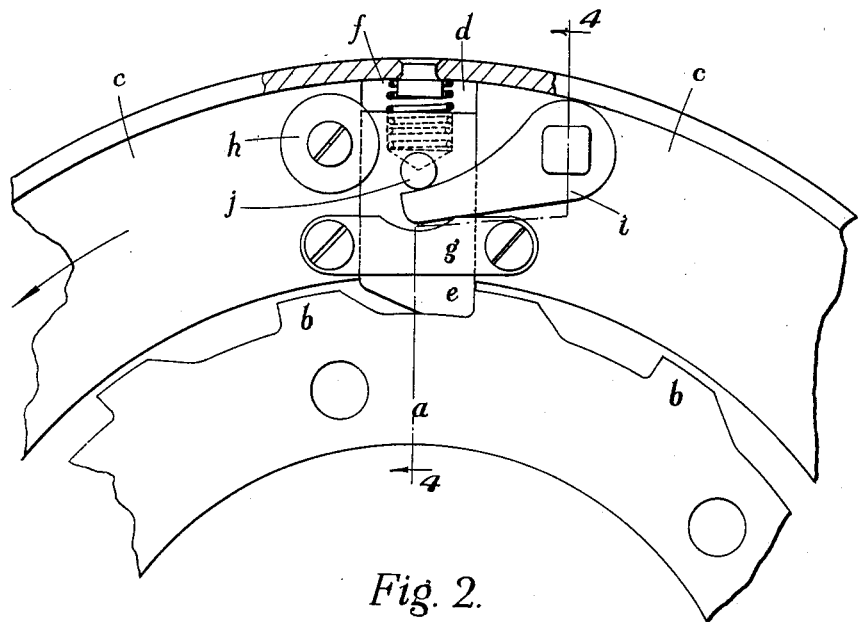
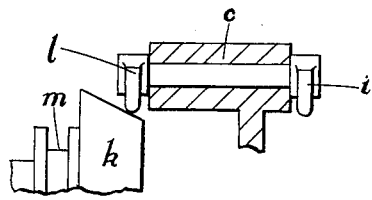
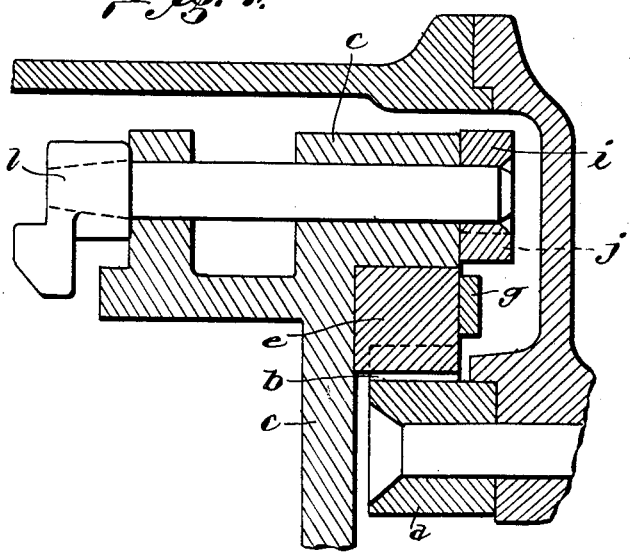
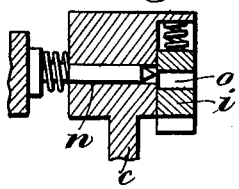
INVENTOR
James Pratt
BY
R. Harding
ATTORNEY Patented Aug. 22, 1933

1,923,842

UNITED STATES PATENT OFFICE 1,923,842

SPRAG GEAR MECHANISM

James Pratt, Newcastle-on-Tyne, England, assignor to Sir W. G. Armstrong, Whitworth and Company (Engineers) Limited, Newcastle-on-Tyne, England, a British Company Application March 12, 1931, Serial No. 522,089, and in Great Britain March 29, 1930

4 Claims. (Cl. 188—30)

This invention relates to sprag gear mechanism, and more especially to sprag gear for motor vehicles.

The invention has for its object to provide means whereby the sprag mechanism is automatically thrown out of engagement on the vehicle exceeding a predetermined speed, so that any noise from the sprag mechanism is eliminated.

According to the present invention the sprag gear comprises a rotating member forming a part of or in permanent driving connection with the transmission, a fixed ratchet member, a sprag in the rotating member adapted to move into and out of engagement with the teeth of the ratchet member, and spring means for normally urging the sprag to engage the ratchet member, the arrangement being such that on the rotating member exceeding a predetermined speed the sprag is thrown out of engagement with the ratchet member under the action of centrifugal force.

Preferably the reverse faces of the ratchet teeth are formed with a cam slope or incline, a corresponding incline being formed on the sprag so that for forward running at slow speed the sprag is cammed outwardly out of action and rides over the inclined face of each tooth. In operation when the vehicle is in motion in a forward direction and running under a predetermined speed, the sprag is reciprocated into and out of engagement by the action of the inclined faces. When the predetermined speed is exceeded the sprag then assumes a position out of engagement with the ratchet owing to the action of centrifugal force which becomes sufficient to overcome the tension of the spring.

Preferably means are provided for rendering the sprag mechanism inoperative when it is desired to move backwards.

The invention is illustrated in the accompnaying drawing in which Fig. 1 is a part elevation of sprag gear constructed in accordance with the invention. Figs. 2 and 3 are detail views of alternative forms of mechanism for rendering the sprag gear inoperative. Fig. 4 is a sectional view taken on line 4—4 of Fig. 1 in the direction of the arrows. Referring to the drawing $a$ is a stationary ring fast with the carriage or frame of the vehicle and on which are formed a number of teeth $b$. $c$ is a second ring mounted to rotate and which may form a part of the transmission 1. Slidably mounted in a radial slot $d$ in the ring $c$ is a sprag or tooth $e$ normally urged by a spring $f$ to move to a position to engage the teeth $b$.

The sprag $e$ is held in position in the slot $d$ by means of a plate $g$ and washer $h$ both secured to the ring $c$ by screws, to permit of easy renewal of the sprag. When the vehicle is in motion in a forward direction the reaction of the fixed teeth in ring $a$ against the inclined portion of the sliding tooth $e$ causes the latter to be reciprocated into and out of engagement with the ring $a$ until a predetermined speed is reached after which it is maintained out of engagement by centrifugal action so long as the vehicle is travelling in a forward direction and above the predetermined speed.

A rocking arm $i$ is provided on the ring $c$ for engagement with a pin $j$ on the sprag $e$ in order to lift the sprag out of the path of the teeth when it is desired to render the sprag gear inoperative.

The lever $i$ may for example be operated by means of an axially slidable cone $k$ see Figure 2, and for this purpose a lever $l$ is mounted on the fulcrum pin of the lever $i$ and adapted to engage with the cone $k$ so that when the latter is moved axially to cause lever $l$ to ride up over the surface of the cone, the sprag will be disengaged. $m$ is a groove for an operating slipper to work in.

Fig. 3 illustrates an alternative arrangement in which a spring influenced tapered pin $n$ axially slidable in the ring $c$ is provided to engage a normally out-of-centre hole $o$ in the lever $i$, which pin when in engagement with the hole $o$ holds the sprag in inoperative position.

It will be obvious that a number of sliding keys or teeth may be provided on the same rotating member which member is preferably situated on some portion of the drive of the vehicle that is in permanent rotational connection with the road wheels.

I claim:

1. In sprag gear mechanism the combination of a rotating member forming a part of the transmission, a fixed ratchet member in substantially the same plane as the said rotating member, a radial groove in the said rotating member, a sprag adapted to slide with rectilinear motion in the said groove and spring means for normally urging the sprag to engage with the ratchet member.

2. Sprag gear mechanism according to claim 1, a pin on the sprag, a rocking arm on the rotating member adapted to engage the said pin and means for rocking the said rocking arm.

3. Sprag gear mechanism according to claim 1, a pin on the sprag, a fulcrum pin on the rotating member, a rocking arm on the said fulcrum pin, a second rocking arm on the said fulcrum pin, an axially movable cone with which the said second arm is adapted to engage so that when the cone is moved the second arm will be made to ride up over the surface of the cone to cause the first arm to raise the sprag out of engagement.

4. Sprag gear mechanism according to claim 1, a pin on the sprag, a fulcrum pin on the rotating member, a rocking arm on the said fulcrum pin, a second rocking arm on the said fulcrum pin, an axially slidable spring influenced tapered pin, a hole in the said rocking arm normally out-of-centre with the said tapered pin, but adapted for engagement with the said pin, so that when the pin engages the hole the sprag is in the inoperative position.

JAMES PRATT.